United States Patent
Kawaguchi et al.

(10) Patent No.: US 11,169,322 B2
(45) Date of Patent: Nov. 9, 2021

(54) OPTICAL FIBER, COLORED OPTICAL FIBER, AND OPTICAL TRANSMISSION SYSTEM

(71) Applicant: SUMITOMO ELECTRIC INDUSTRIES, LTD., Osaka (JP)

(72) Inventors: Yuki Kawaguchi, Osaka (JP); Yoshiaki Tamura, Osaka (JP); Hirotaka Sakuma, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 16/286,879

(22) Filed: Feb. 27, 2019

(65) Prior Publication Data
US 2019/0278020 A1    Sep. 12, 2019

(30) Foreign Application Priority Data

Mar. 6, 2018    (JP) .............................. JP2018-039355

(51) Int. Cl.
*G02B 6/02*    (2006.01)
*G02B 6/028*    (2006.01)
*G02B 6/036*    (2006.01)

(52) U.S. Cl.
CPC ..... *G02B 6/02019* (2013.01); *G02B 6/02395* (2013.01); *G02B 6/03611* (2013.01);
(Continued)

(58) Field of Classification Search
CPC ............ G02B 6/02019; G02B 6/03694; G02B 6/02395; G02B 6/03611; G02B 6/03627;
(Continued)

(56) References Cited

U.S. PATENT DOCUMENTS

| 6,181,858 B1* | 1/2001 | Kato | .................. | G02B 6/02014 |
|  |  |  |  | 385/123 |
| 2006/0062534 A1* | 3/2006 | Aikawa | .............. | G02B 6/02009 |
|  |  |  |  | 385/127 |

FOREIGN PATENT DOCUMENTS

EP    1076250 A1    2/2001

OTHER PUBLICATIONS

Telecommunication Standardization Sector of ITU (ITU-T), Recommendation ITU-T g.650.1, "Definitions and test methods for linear, deterministic attributes of single-mode fibre and cable," Mar. 2018, pp. 1-78.
(Continued)

*Primary Examiner* — Kaveh C Kianni
*Assistant Examiner* — Hung Q Lam
(74) *Attorney, Agent, or Firm* — Faegre Drinker Biddle & Reath LLP

(57) ABSTRACT

An optical fiber having an effective area that can be easily increased and bending loss characteristics that can be easily improved is provided. The optical fiber includes a glass fiber including a core and a cladding; a first resin coating layer that is in contact with the glass fiber and surrounds the glass fiber; and a second resin coating layer that surrounds the first resin coating layer and has a Young's modulus greater than a Young's modulus of the first resin coating layer. An effective area is greater than or equal to 110 $\mu m^2$ and less than or equal to 180 $\mu m^2$ at a wavelength of 1550 nm. A cable cut-off wavelength is less than or equal to 1530 nm. A uniformity of thickness of the first resin coating layer is greater than or equal to 60% and less than or equal to 80%.

11 Claims, 6 Drawing Sheets

(52) U.S. Cl.
CPC ..... *G02B 6/03627* (2013.01); *G02B 6/03694*
(2013.01); *G02B 6/03638* (2013.01)
(58) Field of Classification Search
CPC  G02B 6/03638; G02B 6/443; G02B 6/03666;
G02B 6/036
USPC .................................. 385/123–128
See application file for complete search history.

(56) References Cited

OTHER PUBLICATIONS

T. Kato et al., "Ultra-low nonlinearity low-loss pure silica core fibre for long-haul WDM transmission," Electronics Letters, Sep. 16, 1999, pp. 1615-1617, vol. 35, No. 19.
Marianne Bigot-Astruc et al., "Trench-Assisted Profiles for Large-Effective-Area SingleMode Fibers," ECOC, Sep. 2008, paper Mo.4.B.1, pp. 73-74, vol. 1.

* cited by examiner

OPTICAL FIBER, COLORED OPTICAL FIBER, AND OPTICAL TRANSMISSION SYSTEM

BACKGROUND OF THE INVENTION

1. Field of the Invention

The present invention relates to an optical fiber, a colored optical fiber, and an optical transmission system.

2. Description of the Related Art

Optical fibers used as optical transmission lines that transmit signal light in optical transmission systems desirably have low loss and low nonlinearity to increase the signal-to-noise (SN) ratio. The nonlinearity of an optical fiber can be effectively reduced by increasing the effective area of the optical fiber. When the core diameter is increased to increase the effective area of the optical fiber, the optical fiber propagates high-order-mode light. To prevent signal degradation due to modal interference, the cable cut-off wavelength described in Recommendation G.650.1 of Telecommunication Standardization Sector of International Telecommunication Union (ITU-T) is required to be less than or equal to the wavelength of the signal light. For example, when the signal light propagates in the C-band (1530 nm to 1565 nm), the cable cut-off wavelength is required to be less than or equal to 1530 nm.

Examples of known refractive index profiles of optical fibers that effectively serve as single-mode optical fibers at a wavelength of 1530 nm or more and that have increased effective areas include W-type and trench-type refractive index profiles. Unlike a simple-step-type refractive index profile, these refractive index profiles increase bending loss only for high-order-mode light so that the effective area can be increased while the cable cut-off wavelength is maintained at the desired wavelength. According to the related art, the effective area has been increased and the bending loss characteristics have been improved by appropriately designing and adjusting the refractive index profiles of the optical fibers. For example, see T. Kato et al., Electron. Lett., vol. 35. pp. 1615-1617, 1999, or M. Bigot-Astruc, et al., ECOC 08, paper Mo.4.B.1.

SUMMARY OF THE INVENTION

Accordingly, it is an object of the present invention to provide an optical fiber and a colored optical fiber having an increased effective area and improved bending loss characteristics. It is also an object of the present invention to provide an optical transmission system including the optical fiber as an optical signal transmission line and having an increased SN ratio.

An optical fiber according to the present invention includes a glass fiber including a core and a cladding that surrounds the core and has a refractive index lower than a refractive index of the core; a first resin coating layer that is in contact with the glass fiber and surrounds the glass fiber; and a second resin coating layer that surrounds the first resin coating layer and has a Young's modulus greater than a Young's modulus of the first resin coating layer. According to the optical fiber of the present invention, an effective area is greater than or equal to 110 $\mu m^2$ and less than or equal to 180 $\mu m^2$ at a wavelength of 1550 nm. A cable cut-off wavelength is less than or equal to 1530 nm. The uniformity of thickness of the first resin coating layer is greater than or equal to 60% and less than or equal to 80%.

A transmission loss of the optical fiber according to the present invention is preferably less than or equal to 0.174 dB/km at a wavelength of 1550 nm. The cladding preferably includes an inner cladding that surrounds the core and has a refractive index lower than the refractive index of the core and an outer cladding that surrounds the inner cladding and has a refractive index lower than the refractive index of the core and higher than the refractive index of the inner cladding. The core preferably includes a depressed portion disposed at a center and a ring core that surrounds the depressed portion and has a refractive index higher than a refractive index of the depressed portion.

A colored optical fiber according to the present invention includes the above-described optical fiber according to the present invention and a color layer that surrounds the second resin coating layer of the optical fiber. The color layer has an outer diameter that is greater than or equal to 180 $\mu m$ and less than or equal to 210 $\mu m$. An optical transmission system according to the present invention includes the optical fiber according to the present invention as an optical transmission line.

According to the optical fiber of the present invention, the effective area can be easily increased and the bending loss characteristics can be easily improved.

DESCRIPTION OF THE PREFERRED EMBODIMENTS

Figure 1:
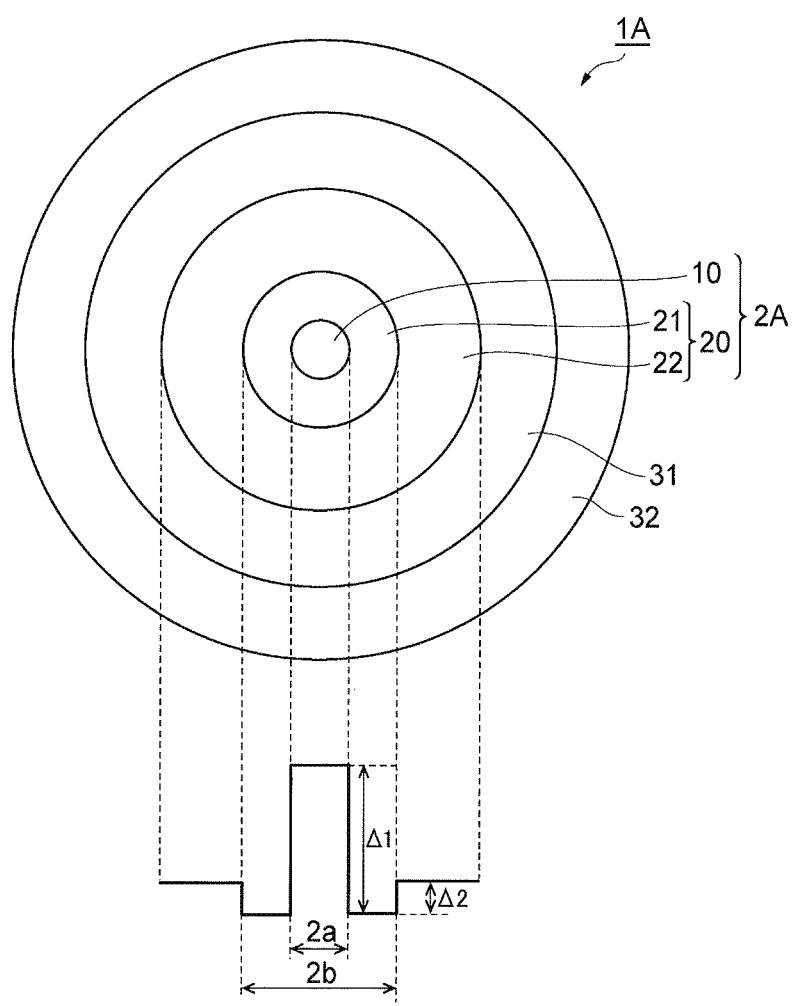
FIG. 1 is a conceptual diagram illustrating a cross section and a refractive index profile of an optical fiber according to an embodiment of the present invention.

When the refractive index profile of an optical fiber is designed and adjusted to increase the effective area and improve the bending loss characteristics, the optical fiber may have a complex structure, and the mass productivity (manufacturing tolerance) thereof may be reduced. The inventors of the present invention have conducted intensive studies and found that the effective area of an optical fiber can be increased and the bending loss characteristics of the optical fiber can be improved by forming a resin coating layer, which surrounds a glass fiber including a core and a cladding, such that the resin coating layer has an appropriate cross section.

An embodiment of the present invention will now be described in detail with reference to the accompanying drawings. In the description referring to the drawings, the same elements are denoted by the same reference numerals, and redundant description is thus omitted. The present invention is not limited to examples described below. The present invention is defined by the scope of the claims, and is intended to include equivalents to the scope of the claims and all modifications within the scope.

FIG. 1 is a conceptual diagram illustrating a cross section and a refractive index profile of an optical fiber 1A. The optical fiber 1A includes a glass fiber 2A including silica glass as a main component; a first resin coating layer 31 that surrounds the glass fiber 2A; and a second resin coating layer 32 that surrounds the first resin coating layer 31. The first resin coating layer 31 and the second resin coating layer 32 are made of an ultraviolet cured resin. The Young's modulus of the second resin coating layer 32 is greater than the Young's modulus of the first resin coating layer 31.

The glass fiber 2A includes a core 10 and a cladding 20 that surrounds the core 10. The refractive index of the cladding 20 is lower than the refractive index of the core 10. The cladding 20 may include an inner cladding 21 that surrounds the core 10 and an outer cladding 22 that surrounds the inner cladding 21 so that the glass fiber 2A has a W-type refractive index profile. In such a case, the refractive index of the inner cladding 21 is lower than the refractive index of the core 10. The refractive index of the outer cladding 22 is lower than the refractive index of the core 10 and higher than the refractive index of the inner cladding 21.

To form the glass fiber 2A having the above-described refractive index profile, for example, the core 10 is substantially made of pure silica glass, and the cladding 20 is made of silica glass containing fluorine. Alternatively, the core 10 is made of silica glass containing $GeO_2$, the inner cladding 21 is made of silica glass containing fluorine, and the outer cladding 22 is substantially made of pure silica glass.

When the optical fiber 1A receives a sideways external force (lateral pressure), the refractive index of the glass fiber 2A slightly varies, and leakage loss occurs as a result of coupling between light that propagates through the core 10 and cladding modes. In general, two or more coating layers (first resin coating layer 31 and second resin coating layer 32) are provided around the optical fiber 1A. The first resin coating layer 31, which is adjacent to the glass fiber 2A, has a large influence on the variation in the refractive index of the glass fiber 2A due to the lateral pressure.

As the difference in effective refractive index between the propagation modes and the cladding modes decreases, the propagation modes are more easily coupled to the cladding modes. Among the propagation modes, high-order modes have an effective area larger than that of the fundamental mode. Therefore, the high-order modes have a low effective refractive index due to the cladding 20 having a low refractive index, and the difference in effective refractive index between the high-order modes and the cladding modes is small. Accordingly, the high-order modes easily cause leakage loss in response to a variation in the shape of the first resin coating layer 31.

Therefore, by appropriately controlling the shape of the first resin coating layer 31 of the optical fiber 1A in the longitudinal direction, only the scattering loss of the high-order modes can be increased while the scattering loss of the fundamental mode is maintained low. As a result, the effective area can be increased while the cable cut-off wavelength is maintained within a desired range. The shape of the first resin coating layer 31 in the longitudinal direction can be easily controlled by, for example, adjusting the time or power of ultraviolet radiation for curing the resin applied to the glass fiber immediately after drawing, or by adjusting the conditions under which the optical fiber is wound around a bobbin after the resin is cured by ultraviolet radiation.

The optical fiber 1A having the structure illustrated in FIG. 1 was manufactured, and the cable cut-off wavelength and the transmission loss thereof were evaluated. The outer diameter 2a of the core 10 was 12 μm, and the outer diameter 2b of the inner cladding 21 was 36 μm. The relative refractive index difference Δ1 of the core 10 with respect to the inner cladding 21 was 0.32%, and the relative refractive index difference Δ2 of the outer cladding 22 with respect to the inner cladding 21 was 0.06%. The uniformity of thickness of the first resin coating layer 31 of the optical fiber 1A was set to various values. The uniformity of thickness [%] of the first resin coating layer 31 is defined by the minimum and maximum thicknesses of the first resin coating layer 31 in the radial direction on a cross section perpendicular to the fiber axis as (minimum thickness/maximum thickness)×100.

Figure 2:
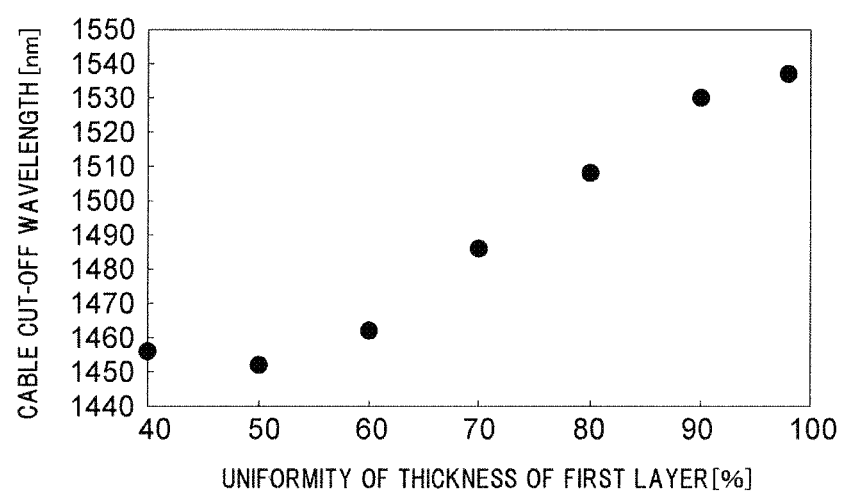
FIG. 2 is a graph showing the relationship between the uniformity of thickness of a first resin coating layer and the cable cut-off wavelength.
Figure 3:
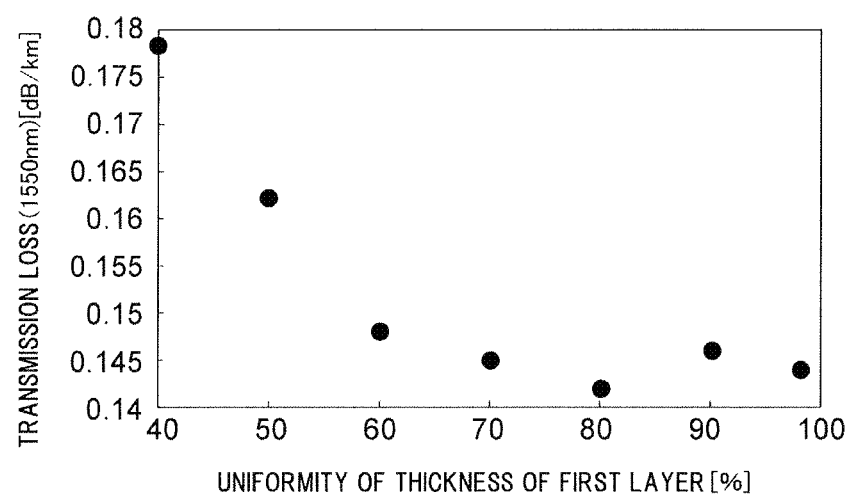
FIG. 3 is a graph showing the relationship between the uniformity of thickness of the first resin coating layer and the transmission loss at a wavelength of 1550 nm.

FIG. 2 is a graph showing the relationship between the uniformity of thickness of the first resin coating layer 31 and the cable cut-off wavelength. As the uniformity of thickness of the first resin coating layer 31 decreases, the cable cut-off wavelength also decreases. FIG. 3 is a graph showing the relationship between the uniformity of thickness of the first resin coating layer 31 and the transmission loss at a wavelength of 1550 nm. When the uniformity of thickness of the first resin coating layer 31 is less than 60%, the transmission loss increases. FIGS. 2 and 3 show that when the uniformity of thickness of the first resin coating layer 31 is greater than or equal to 60% and less than or equal to 80%, an increase in the transmission loss can be suppressed and the effective area can be increased.

The optical fiber 1A, which has the structure illustrated in FIG. 1, has an effective area of greater than or equal to 110 μm$^2$ and less than or equal to 180 μm$^2$ at a wavelength of 1550 nm and a cable cut-off wavelength of 1530 nm or less. The uniformity of thickness of the first resin coating layer 31 is greater than or equal to 60% and less than or equal to 80%. The effective area of the optical fiber 1A can be easily increased, and the bending loss characteristics of the optical fiber 1A can be easily improved. Preferably, the transmission loss is 0.174 dB/km or less at a wavelength of 1550 nm.

Although an optical fiber having a W-type refractive index profile is described above as an example, the shape of the refractive index profile is not limited to this. The above-described method may also be applied to an optical fiber having, for example, a simple-step-type, trench-type, or hole-assisted-type refractive index profile, or to an optical fiber 1B having the structure illustrated in FIG. 4.

Figure 4:
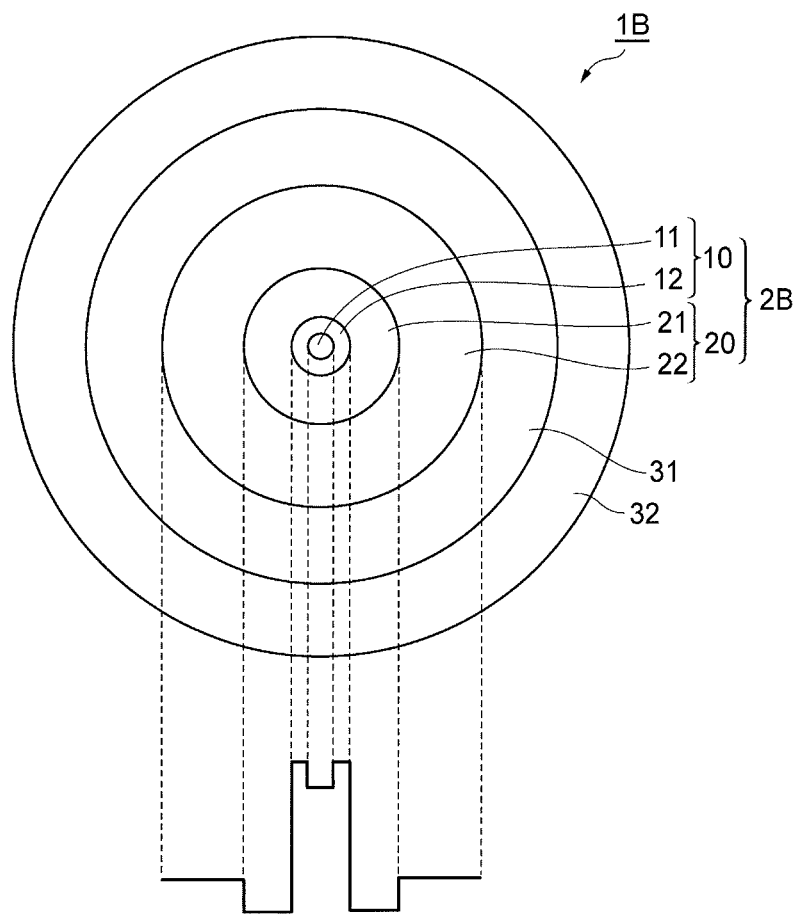
FIG. 4 is a conceptual diagram illustrating a cross section and a refractive index profile of an optical fiber according to another embodiment of the present invention.

FIG. 4 is a conceptual diagram illustrating a cross section and a refractive index profile of the optical fiber 1B. The optical fiber 1B includes a glass fiber 2B including a core 10. The core 10 includes a depressed portion 11 and a ring core 12. The ring core 12 surrounds the depressed portion 11 provided at the center. The refractive index of the depressed portion 11 is higher than the refractive index of an outer cladding 22. The refractive index of the ring core 12 is higher than the refractive index of the depressed portion 11.

The optical fiber 1B having the above-described structure also has an effective area of greater than or equal to 110 μm$^2$ and less than or equal to 180 μm$^2$ at a wavelength of 1550 nm and a cable cut-off wavelength of 1530 nm or less. The uniformity of thickness of the first resin coating layer is greater than or equal to 60% and less than or equal to 80%. The effective area of the optical fiber 1B can be easily increased, and the bending loss characteristics of the optical fiber 1B can be easily improved. Preferably, the transmission loss is 0.174 dB/km or less at a wavelength of 1550 nm.

The effective area of the optical fiber 1B having the above-described structure can be increased without changing the mode field diameter. In other words, the optical fiber 1B may be connected to a standard single-mode optical fiber without causing a large splicing loss, and the nonlinearity thereof can be reduced.

Figure 5:
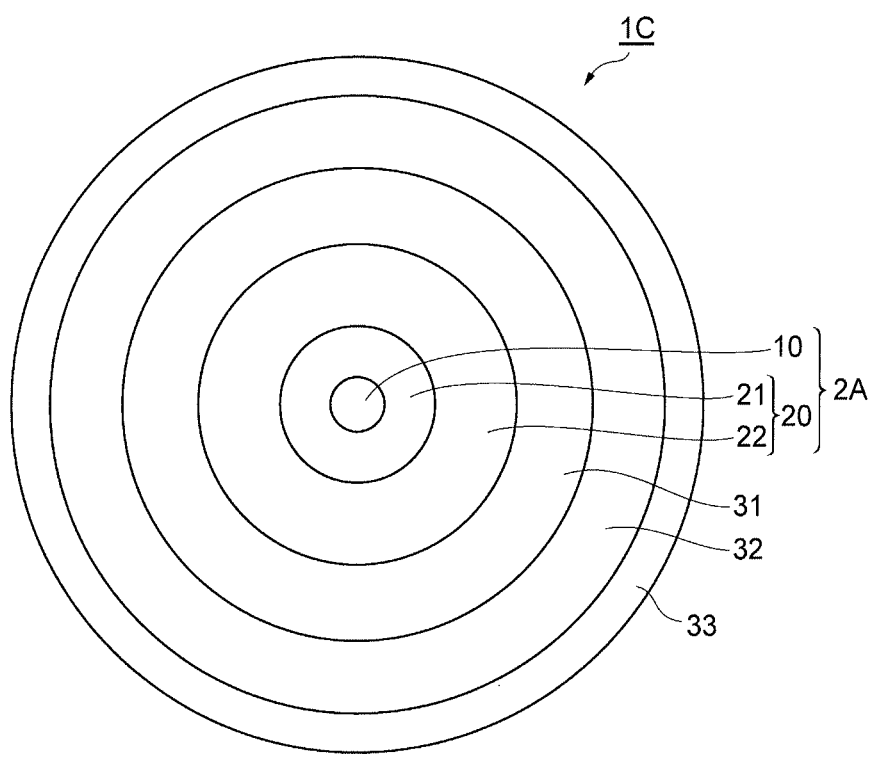
FIG. 5 is a conceptual diagram illustrating a cross section of a colored optical fiber according to an embodiment of the present invention.

FIG. 5 is a conceptual diagram illustrating a cross section of a colored optical fiber 1C. The colored optical fiber 1C includes a color layer 33 that surrounds the second resin coating layer 32 of the optical fiber 1A illustrated in FIG. 1. The outer diameter of the color layer 33 is greater than or equal to 180 µm and less than or equal to 210 µm. A common colored optical fiber including a color layer has an outer diameter of about 250 µm. In recent years, attempts have been made to increase the density of colored optical fibers in an optical cable by reducing the outer diameter of the colored optical fibers to 200 µm. The colored optical fibers having such a small diameter are required to have improved bending loss characteristics. The colored optical fiber 1C according to the present embodiment has an improved bending loss characteristics, while it has a small diameter.

Figure 6:
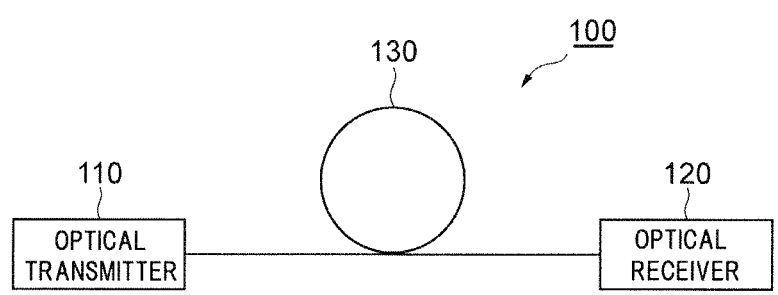
FIG. 6 is a conceptual diagram illustrating the configuration of an optical transmission system according to an embodiment of the present invention.

FIG. 6 is a conceptual diagram illustrating the configuration of an optical transmission system 100. The optical transmission system 100 includes an optical transmitter 110 that emits, for example, C-band signal light, an optical transmission line 130 that transmits the signal light, and an optical receiver 120 that receives the signal light. The optical transmission system 100 includes the optical fiber according to the present embodiment as the optical transmission line 130. The optical transmission line 130 has low loss and low nonlinearity. Thus, the optical transmission system 100 has an increased SN ratio and is capable of long-distance, large capacity signal light transmission.

1A, 1B: optical fiber, 1C: colored optical fiber, 2A, 2B: glass fiber, 10: core, 11: depressed portion, 12: ring core, 20: cladding, 21: inner cladding, 22: outer cladding, 31: first resin coating layer, 32: second resin coating layer, 33: color layer, 100: optical transmission system, 110: transmitter, 120: receiver, 130: optical transmission line

What is claimed is:

1. An optical fiber comprising:
   a glass fiber including a core and a cladding that surrounds the core and has a refractive index lower than a refractive index of the core;
   a first resin coating layer that is in contact with the glass fiber and surrounds the glass fiber; and
   a second resin coating layer that surrounds the first resin coating layer and has a Young's modulus greater than a Young's modulus of the first resin coating layer,
   wherein an effective area is greater than or equal to 110 $\mu m^2$ and less than or equal to 180 $\mu m^2$ at a wavelength of 1550 nm,
   wherein a cable cut-off wavelength is less than or equal to 1530 nm, and
   wherein a uniformity of thickness of the first resin coating layer is greater than or equal to 60% and less than or equal to 80%.

2. The optical fiber according to claim 1, wherein a transmission loss is less than or equal to 0.174 dB/km at a wavelength of 1550 nm.

3. The optical fiber according to claim 1, wherein the cladding includes
   an inner cladding that surrounds the core and has a refractive index lower than the refractive index of the core, and
   an outer cladding that surrounds the inner cladding and has a refractive index lower than the refractive index of the core and higher than the refractive index of the inner cladding.

4. The optical fiber according to claim 2, wherein the cladding includes
   an inner cladding that surrounds the core and has a refractive index lower than the refractive index of the core, and
   an outer cladding that surrounds the inner cladding and has a refractive index lower than the refractive index of the core and higher than the refractive index of the inner cladding.

5. The optical fiber according to claim 1, wherein the core includes
   a depressed portion disposed at a center, and
   a ring core that surrounds the depressed portion and has a refractive index higher than a refractive index of the depressed portion.

6. The optical fiber according to claim 3, wherein the core includes
   a depressed portion disposed at a center, and
   a ring core that surrounds the depressed portion and has a refractive index higher than a refractive index of the depressed portion.

7. The optical fiber according to claim 4, wherein the core includes
   a depressed portion disposed at a center, and
   a ring core that surrounds the depressed portion and has a refractive index higher than a refractive index of the depressed portion.

8. A colored optical fiber comprising:
   the optical fiber according to claim 1; and
   a color layer that surrounds the second resin coating layer of the optical fiber, w
   herein the color layer has an outer diameter that is greater than or equal to 180 µm and less than or equal to 210 µm.

9. An optical transmission system comprising: the optical fiber according to claim 1, the optical fiber serving as an optical transmission line.

10. A colored optical fiber comprising:
    the optical fiber according to claim 5; and
    a color layer that surrounds the second resin coating layer of the optical fiber, wherein the color layer has an outer diameter that is greater than or equal to 180 µm and less than or equal to 210 µm.

11. An optical transmission system comprising:
    the optical fiber according to claim 5, the optical fiber serving as an optical transmission line.

* * * * *